(12) United States Patent
Romansky et al.

(10) Patent No.: US 6,535,871 B1
(45) Date of Patent: Mar. 18, 2003

(54) METHOD FOR SEARCHING A DIGITAL RIGHTS MANAGEMENT PACKAGE

(75) Inventors: Brian M. Romansky, Monroe, CT (US); Thomas J. Foth, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 83 days.

(21) Appl. No.: 09/624,671

(22) Filed: Jul. 24, 2000

(51) Int. Cl.[7] .............................. G06F 17/30; H04L 9/00
(52) U.S. Cl. .............................. 707/2; 713/182
(58) Field of Search .................. 707/200, 2–9, 707/1, 205, 500, 515, 526, 529–538; 713/161–168, 182–184, 187–191; 380/239

(56) References Cited

U.S. PATENT DOCUMENTS

| | | | |
|---|---|---|---|
| 5,864,871 A | 1/1999 | Kitain et al. | 707/104 |
| 5,873,086 A | 2/1999 | Fujii | 707/10 |
| 5,892,900 A * | 4/1999 | Ginter | 713/200 |
| 6,314,409 B2 * | 11/2001 | Schneck et al. | 705/54 |

* cited by examiner

Primary Examiner—Alford W. Kindred
(74) Attorney, Agent, or Firm—Ronald Reichman; Angelo N. Chaclas

(57) ABSTRACT

A method that allows a search engine to find a document and allows a potential buyer to review portions of the document. The invention provides a plain text index to the document that may be searched by internet engines and reviewed by potential buyers of the document. The full text of the document remains encrypted and managed by a Digital Rights Management (DRM) package. The index is synchronized and hides contextual information so that potential buyers may determine whether they want to obtain rights to review the document.

6 Claims, 2 Drawing Sheets

METHOD FOR SEARCHING A DIGITAL RIGHTS MANAGEMENT PACKAGE

FIELD OF THE INVENTION

This invention pertains to the searching of documents and, more particularly, to the searching of documents that have been protected by encryption.

BACKGROUND OF THE INVENTION

In the past, buyers inspected goods before they purchased them. For instance, a buyer would enter a book store and browse numerous magazines and, under the observation of book store personnel, view books before purchasing specific books and/or magazines. Thus, the buyer had an opportunity to review the books and/or magazines before purchasing them.

In today's society, with the proliferation of personal computers and the ability to easily connect to the internet, sometimes potential buyers have the ability to review and copy material before they purchase the material. In other instances, the buyers must purchase the material before they have an opportunity to review the material.

Sometimes, owners of textual material prepare a summary of the material they have for sale so that search engines and potential purchasers may find and review the material before purchasing the material. The foregoing works well for non-encrypted textual documents. However, secure or encrypted documents can not be searched. A non-encrypted abstract of a protected encrypted document may solve the above problem since the abstract may be searched. However, the creation of an abstract is expensive and time-consuming. Abstracts are often abridged and do not always contain the information present in the article being searched.

If the owners of textual material encrypted the material before the material is made available, search engines would not be able to search the encrypted material, and potential buyers would have to purchase the material before having a chance to review the material. If the owners of textual material made the material available in plain text, search engines would be able to find the material, and potential buyers may not want to purchase the material, since they have already seen the material.

Digital Rights Management (DRM) packages have been developed to encrypt the text of documents and control a user's access to the document. The restrictions imposed by Digital Rights Management packages often made it difficult for a potential buyer to search a set of documents efficiently without paying for each access to the document (pay per view) or only consuming a limited number of accesses. Hence, a potential buyer may be penalized for searching a document which may or may not be relevant to the buyer's interest.

SUMMARY OF THE INVENTION

This invention overcomes the disadvantages of the prior art by providing an electronic-based method that allows a search engine to find a document allowing a potential buyer to review portions of the document. The invention provides a plain text index to the document that may be searched by search engines and reviewed by potential buyers of the document. The full text of the document remains encrypted and managed by a Digital Rights Management (DRM) package. The index is synchronized and hides contextual information so that potential buyers may determine whether or not they want to obtain rights to review the document. The document may be found in any electronic storage facility, i.e.: the Internet, computer work station, hard disk, computer disk, floppy disk, CD ROM, main frames, etc.

The searchable synchronized index is in plain text in a digital container that protects by encryption a DRM-controlled document. Inclusion of the index in the same digital container as the controlled document ensures proper synchronization of the index and the document.

In some instances, key words in an index may reveal valuable information about the content of the document. For instance, if a document contains a list of the top ten contributors to a political campaign, the key word list may reveal the identity of the contributors. This invention gives the publisher the ability to remove the contributors from the plain text index before the index is included in the digital container. Sensitive words in a document are most likely to be proper names. The proper name key words may be highlighted automatically by comparing all index entries to a standard dictionary and selecting words that are not present. Over time, the publisher of the document may elect to build a list of known sensitive index words which will be excluded automatically from the searchable synchronized index.

The publisher of the document is also given the ability to change the order or relationship of some key words from the searchable synchronized index that may reveal sensitive information or information the publisher does not want to disclose. For instance, the words "ABC Electronics, Inc.", "strong", and "buy" may not be revealing in isolation, but the phrase "ABC Electronics, Inc. strong buy" may have special meaning if it appears in an analyst's report about ABC Electronics, Inc. Thus, the relationship or combination of some key words may be significant. One way to conceal the relationship or combination of certain key words is randomizing the searchable synchronized index of key words. Another method for concealing the relationship or combination of certain key words is to use a context independent hashing rule, i.e., storing the key words in alphabetical order.

The publisher or author of the document also is given the ability to mark sensitive regions of the document so that information contained in these regions would be ignored by the index generation software and not be included in the searchable synchronized index.

The number of times that a word appears in a document may also provide useful information to a search engine. This information may be included in the searchable synchronized index, but only if that particular word does not compromise the value of the content. Frequency information may be suppressed entirely in the searchable synchronized index, or techniques, such as a key word list, may be used to select which words are stored with this information in the searchable synchronized index. Frequency information may also be randomized so that a search engine may obtain a sense of the significance of a particular key word without revealing exactly how often it is used.

DETAILED DESCRIPTION OF THE PREFERRED EMBODIMENT

Figure 1:
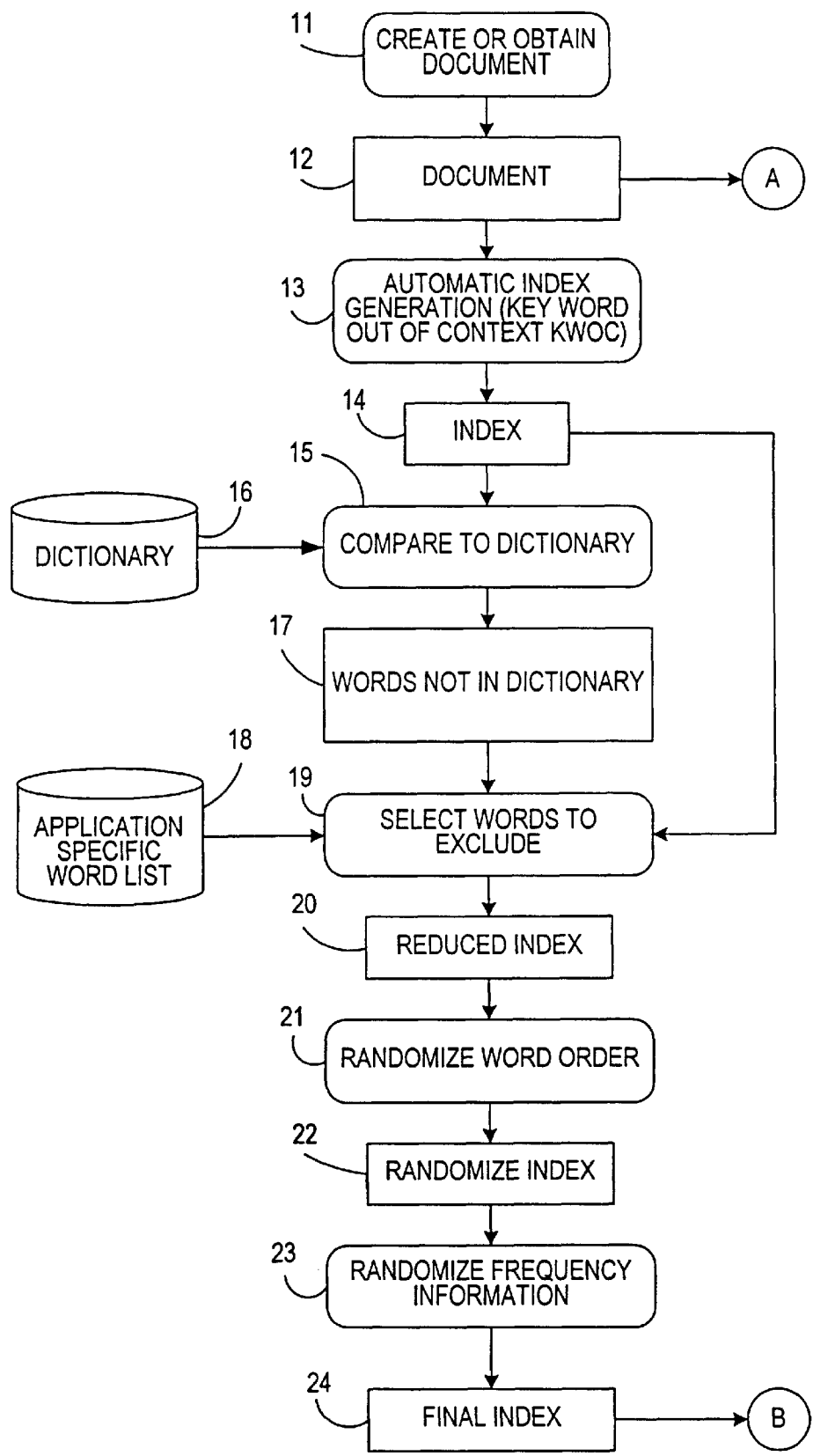
FIGS. 1 and 2. is a drawing of a process for searching for a document and reviewing portions of the document.

Referring now to the drawings in detail, and more particularly to FIG. 1, the reference character 11 represents the process of creating or obtaining a document, i.e. a writing a software program, a drawing, etc. At this point an author, editor, or publisher may tag certain regions of the document so that the tagged regions will be excluded from an index. The tagged document 12 is then automatically indexed in generator 13. Generator 13 is a key word out of context indexer that parses the text file of document 12 into tokens by removing the white space leading and trailing edge of words, removing tabs, carriage returns, and punctuation marks, and eliminates duplicate words to produce a key word out of context index list of tokens 14. Then the words are compared at 15 to the words in a standard words language (English, German, French, Russian, etc.) dictionary 16. Any word that is not in dictionary 16 is placed on the output list of "words not in dictionary" 17.

The application specific word list 18 contains words and phrases specific to a particular application or topic. Each word has an associated flag which may be set to a value of "Retain" or "Delete". At step 19, a reduced index 20 is created. Index 20 comprises the following: words from dictionary 17 which are marked as "Retain" in word list 18, and words from index 14 which do not appear in dictionary 17 and are marked as "Delete" in specific word list 18.

At randomize word order step 21, the order of the tokens in reduced index 20 is randomized. The foregoing produces randomized index 22.

At this point randomized index 22 associates each word with frequency of occurrence numbers retained from index generation process 13. The randomize frequency information process 23 modifies these frequency values by adding a randomly generated offset value. The resulting final index 24 contains frequency information which is incorrect; however, index 24 still retains the general trends of the original frequency information.

Figure 2:
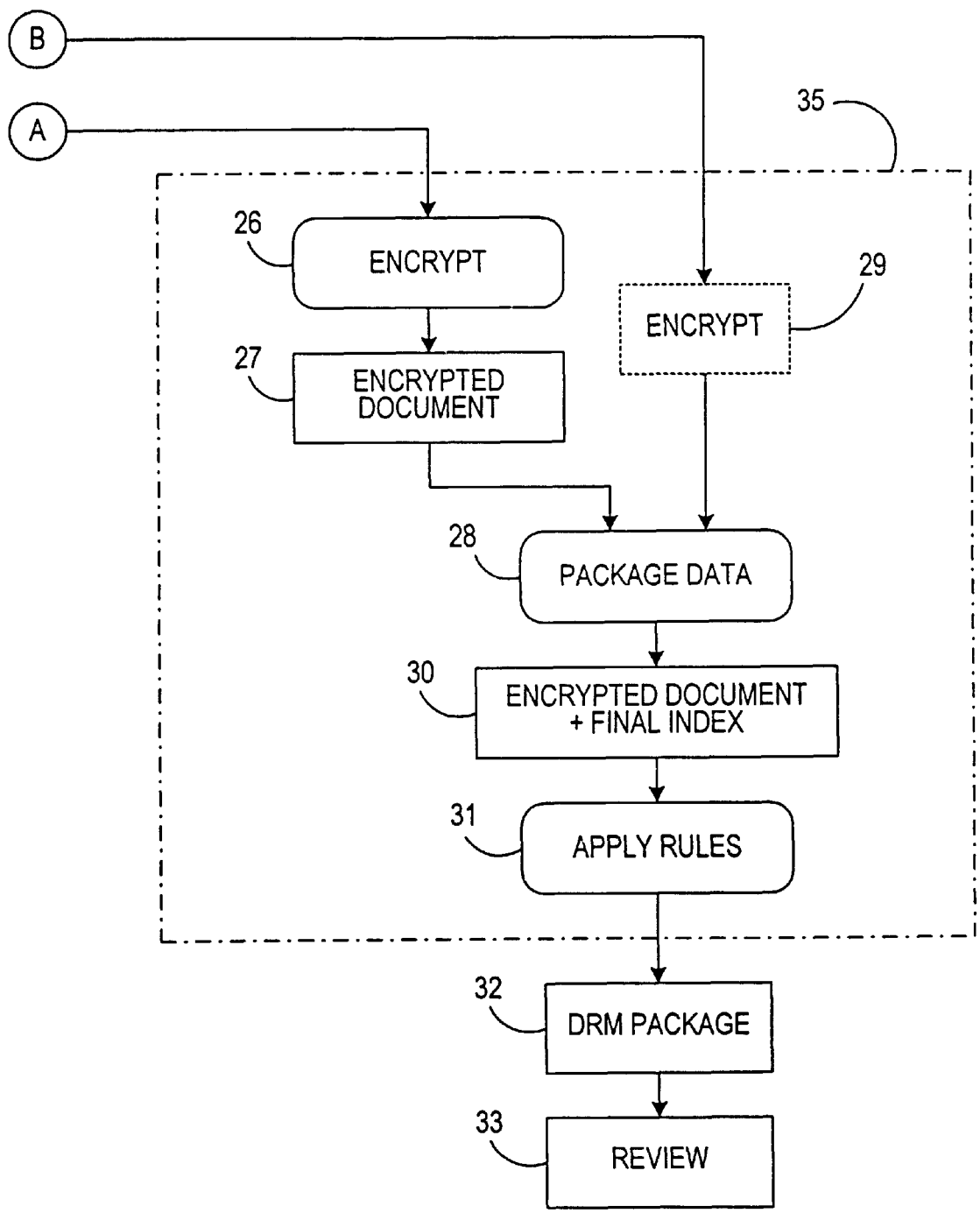

Document 12 is encrypted by encrypt 26 (FIG. 2) and stored in encrypted document 27. Document 12 may be encrypted by (1) the Data Encryption Standards described in FIPS PUB 46, dated Jan. 15, 1977, and published by the United States Department Of Commerce, National Bureau of Standards, herein incorporated by reference; (2) the RSA encryption technique, herein incorporated by reference; or (3) any other encryption technique known in the art. The encrypted document 27 and final index 24 (FIG. 1) are packaged by package data 28 (FIG. 2). In an alternate embodiment of this invention, the information from final index 24 may be encrypted in step 29 so that package data 28 will have only encrypted information, and only authorized search engines may access the indexed information.

The encrypted document 27 and the final index 24 are placed in encrypted document and final index 30. Rules and conditions for opening the document and index are available from apply rules 31.

Steps 26, 27, 28, 30 and 31 perform the function of a DRM processor package 35 that takes the plain text index file in final index 24 and combines it with the encrypted document 27. DRM package 32 contains an encrypted document 27 portion, a final index 24 portion and a rules portion 31 for accessing index 24 and plain text document 12. Consumers will review index 24 to determine if they have any interest in obtaining rights to the plain text document 12. In order to retrieve plain text document 12 from DRM package 32, the DRM System will need to decrypt encrypted document 27.

The above specification describes a new and improved method that allows a consumer to review portions of a document before deciding whether to purchase the document. It is realized that the above description may indicate to those skilled in the art additional ways in which the principals of this invention may be used without departing from the spirit. It is intended, therefore, that this invention be limited only by the scope of the appended claims.

What is claimed is:

1. A method for preparing a document for review, the method comprising the steps of:

creating an index of the document;

removing contextual information from the index so that the index does not reveal the context of the document that may be searched;

removing sensitive words from the index;

removing key words from the index;

randomizing the order of words in the index; and randomizing the frequency information in the index so that the significance of a particular key word may not be determined; and encrypting the full text of the document.

2. The method claimed in claim 1, further including the step of:

allowing potential buyers to review the index so that the buyers may determine whether or not they want to obtain rights to review the document.

3. The method claimed in claim 1, wherein search engines are used for electronic searching of the index.

4. The method claimed in claim 1, wherein the full text of the document remains encrypted and managed by a Digital Rights Management package.

5. The method claimed in claim 1, further including the step of:

maintaining synchronization of the document in the index by having the document and the index in the same file.

6. The method claimed in claim 1, wherein sensitive regions of the document containing sensitive words are marked prior to the production of the index.

* * * * *